Sept. 1, 1931.  L. J. BLACK  1,821,135
CIRCULATING SYSTEM FOR BRAKE FLANGES
Filed June 6, 1929  2 Sheets-Sheet 1
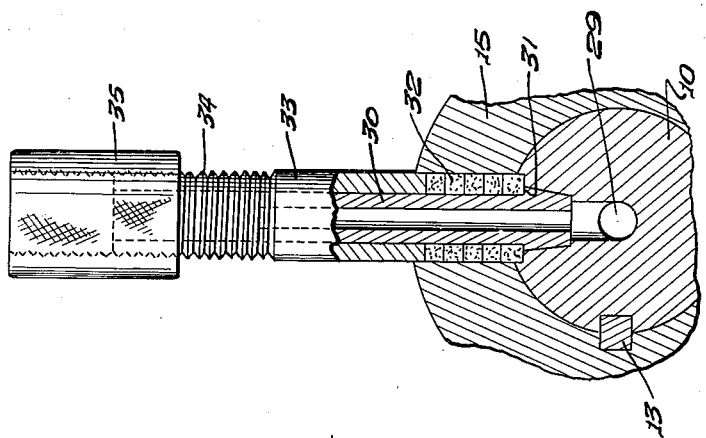
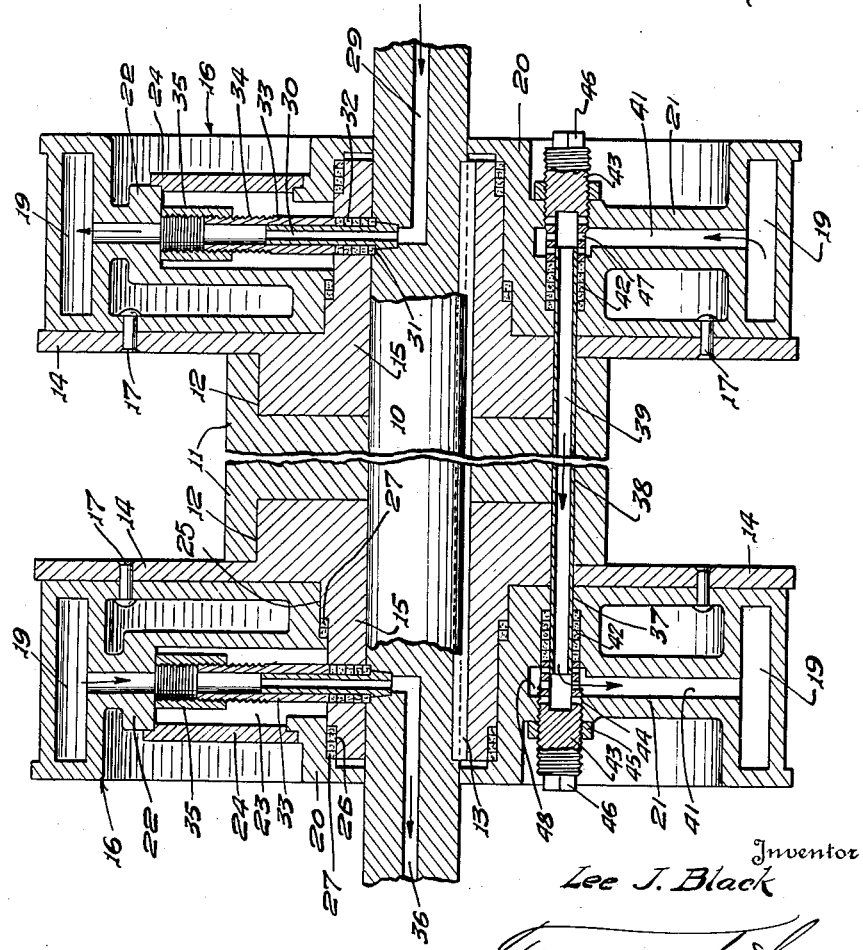
Inventor
Lee J. Black
By Frederick S. Hitt
Attorney Sept. 1, 1931.  L. J. BLACK  1,821,135
CIRCULATING SYSTEM FOR BRAKE FLANGES
Filed June 6, 1929   2 Sheets-Sheet 2
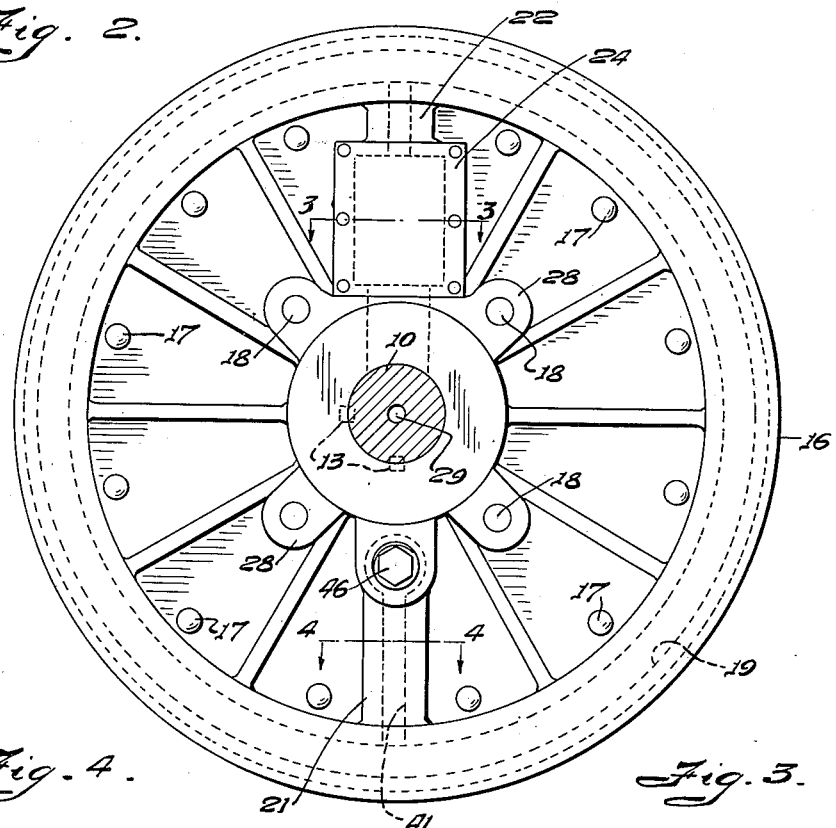
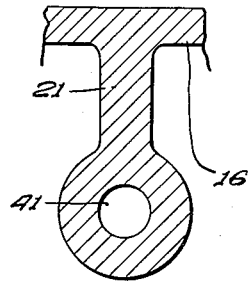
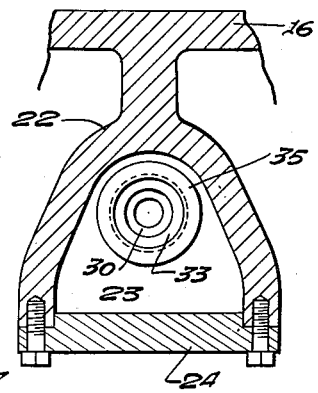
Inventor
Lee J. Black
By Frederick S. Nitt
Attorney Patented Sept. 1, 1931

1,821,135

UNITED STATES PATENT OFFICE

LEE J. BLACK, OF BEAUMONT, TEXAS

CIRCULATING SYSTEM FOR BRAKE FLANGES

Application filed June 6, 1929. Serial No. 368,916.

This invention relates to the drums or "draw-works" used in well drilling and more particularly relates to a system for circulating cooling water or other fluid through the brake flanges of these drums and constitutes an improvement on the general construction disclosed in my Patent No. 1,580,003.

One of the objects of the present invention is to provide means for taking circulating fluid from the shaft, circulating it through the drum flanges and returning it to the shaft without any necessity of drilling bores for the full length of the shaft.

A further object is to provide a circulating system of this character which does away with the necessity of pipe connections in the ends of the drum flanges, which pipe connections are liable to be knocked off by rough usage and because of sudden stops from high revolving speed, which has a tendency to whip off these pipe connections.

A further object is to provide means for packing the circulating system so that no leakage can occur and provide means for positively assuring complete compression of the packing and guaranteeing in effect a seal which will prevent leakage of circulating fluid.

A further object is to provide a very simple means for securing the passage of liquid from one flange to the other.

Other objects will appear in the course of the following description.

My invention is illustrated in the accompanying drawings, wherein:—

Figure 1 is a transverse diametric section through a winding drum having a circulating system constructed in accordance with my invention;

Figure 2 is an end elevation of the drum;

Figure 3 is a section on the line 3—3 of Figure 2;

Figure 4 is a section on the line 4—4 of Figure 2;

Figure 5 is a fragmentary enlarged transverse sectional view through the brake flange at the point of connection with the transverse duct;

Figure 6 is a fragmentary enlarged section through the shaft and the hub of the inner flange, the gland, nut and nipple being partly in section.

Referring to these drawings, 10 designates a drum shaft upon which is mounted the drum center 11. This drum center is bored out as at 12 at its ends and is keyed upon the shaft by a key 13. Both ends of the drum are practically alike. Mounted upon each end of the drum is a flange plate 14 which has an angularly disposed annular hub 15 extending along the shaft and keyed thereto as by the key 13.

Disposed against the flange plate 14 is the hollow brake flange plate 16 formed to fit over the base 15 of the flange plate 14 and to abut against this flange plate 14 and be rigidly connected thereto by the rivets 17, this brake flange, which is designated generally 16, being held in place not only by the rivets 17, but by the tie rods and bolts 18. The brake flange body 16 is cored out to provide a circumferentially extending cooling fluid chamber 19. This is connected to the hub portion 20 of the brake flange 16 by a hollow spoke 21 as it may be called and diametrically opposite the spoke 21, the chamber 19 is connected to the hub 15 of the flange plate by means of an inwardly extending relatively short spoke-like member 22 enlarged to form a chamber 23 whose front face is closed by a cover plate 24 forming the front wall of this chamber. The hub portion 20 of the brake flange 16 is counter-bored as at 25 and the exterior face of the hub portion 15 of the flange plate 14 is stepped to provide for the reception of packing rings 26 and 27 disposed in these counter-bores. The tighter the brake flange 16 is drawn towards the flange plate 14, the tighter this packing will be compressed. For this purpose, I provide the rivets 17 and tie rods 18 passing through lugs 28 projecting outward from the hub 20, these tie rods passing longitudinally through the hub of the flange plate 14 and through the body of the drum 11.

The shaft 10 at one end is formed with a longitudinally extending bore 29 which extends axially of the shaft and then extends radially outward and this lateral extension of the bore has a tapered enlargement adjacent the periphery of the shaft in which fits a tapered nipple 30, this nipple being formed with a shoulder 31. The nipple extends radially outward into the chamber 23 and a packing 32 is disposed around that portion of the nipple which passes through the base or hub 15 of the flange plate 14.

Closely surrounding the nipple and resting upon this packing 32 is a radially disposed gland 33 which is exteriorly screw-threaded as at 34. Having threaded engagement with the outer end of the pipe section 33 is a sleeve nut 35 which normally bears against the outer end of the chamber 23 concentrically to the bore leading from this chamber through the hollow spoke 22 into the circumferential chamber 19. It will be obvious that in inserting these pipe sections 33 and 35 and the nipple 30, the sleeve 35 may be shifted down its full distance upon the pipe section 33, the nipple then inserted in place, with the pipe section 34 against the packing 32 and the pipe section 35 may then be turned outward upon the section 34 until it is jammed against the outer end wall of the chamber 23 and this will act to compress the packing 32 and form a water-tight joint between the nipple and the pipe sections 33 and 35.

It will be seen that the pipe section 33 constitutes in effect a gland which is forced in against the packing 32 and forces this packing into solid contact with the shaft 10. It will also be noted that the shoulder 31 on the nipple securely anchors this nipple beneath the packing into the shaft and that inasmuch as the nipple is tapered and the bore and the shaft are tapered, a practical ground joint is secured. However, if there should be a slight leak of circulating fluid, it will come in contact with the packing 32, which being compressed in a recess in the shaft 10 will make a fluid-tight joint preventing leaks and compelling the liquid to pass upward into the pocket or circumferential chamber 19. After the pipe section or sleeve 35 has been adjusted, as before described, to force the gland 33 into engagement with the packing 32, then the cover plate 24 is put in place, which positively insures against leaking and compels all the circulating liquid to pass upward and into the hollow brake flange.

As before remarked, the shaft 10 is formed with a longitudinally extending bore 29 at one end which constitutes the inlet bore for the liquid while the other end of the shaft is formed with a bore 36 which constitutes the outlet and which is connected to the chamber 19 in exactly the same manner that the bore 29 is connected to the chamber and by the same parts.

It is necessary, of course, to provide means whereby the chambers 19 of the two brake flanges 16 shall be connected to each other. To that end, the base of each brake flange 16 and flange plate 14 is formed with a longitudinally extending bore 37 which is in alinement with a bore 38 extending longitudinally through the drum 11. A pipe section 39 is disposed within the bore 38 and extends into the bores 37. The bore 37 in the brake flanges 16 is enlarged at 40 and extends out to the chamber 19 by means of the duct 41 in the spoke 21. The pipe section 39 extends into this enlarged portion 41 of the bore so as to support the packing 42 around the pipe section 39. Operating in the end of each enlargement 40 of the bore, is a gland 43 having screw-threaded engagement at 44 with the hub 20 of the brake flange and bearing at its inner end against the packing 42. A set nut 45 engages the projecting end of the gland 43 and bears against the face of the brake flange 16 so as to lock the gland 43 in adjusted position. The extremity of the gland 43 is formed with a many-sided head 46 whereby a wrench may be applied thereto.

The gland 43 is formed with a plurality of radial perforations 47 which discharge into a circumferential passage 48 formed in the valve body, this passage communicating with a radially extending bore 41 formed in the spoke portion 21, this bore 41, of course, opening into the peripheral chamber 19.

With this construction, it will be obvious, particularly from Figure 1 that cold water or other liquid forced into the bore 29 will pass radially outward to the chamber 19 of one brake flange 16, will pass around this brake flange, to keep this flange cool, and then water will pass inward, as shown by arrows in Figure 1 to the interior of the gland 43 of this brake flange, then will pass by way of the bores 39 and 40 into the gland 43 of the opposite flange, and will then pass outward through bore 49 to the peripheral chamber 19 of this flange, will pass around this chamber and then inward through the pipe section 35, the gland 34 and the nipple 30 to the bore 36 and then outward to a discharge point. It will be obvious, of course, that this cooling fluid may be constantly circulated and thus the temperature of these brake drum flanges which are subjected to very great friction may be kept constantly reduced.

It will be seen that with this construction, backing off the nuts 35 of the glands 33 forces the gland inward against the packing 32, forcing the packing into solid contact with the shaft 10. The shoulder on the nipple 30 securely anchors this nipple beneath the packing 32 and into the shaft. By tapering the nipple and having a shoulder at the point of contact with the packing 32, it is not necessary to thread the nipple, doing away with the possibility of the nipple breaking off and causing a leak, as it is liable to do when threads are depended upon, where in the present instance there is considerable vibration due to the operation of these drums such as is caused by sudden stops from a high revolving speed. This has a tendency to whip off all pipe connections reaching from the shaft to the outer flange.

It will be seen in this relation that the only pipe connections are the connections between the nipple 30, the pipe section or gland 33 and the small pipe section or nut 35 and if by any chance these pipe connections should break at the shoulder of the nipple, that portion of the nipple which is embedded in the shaft may be easily withdrawn and a new nipple put in place. The cover plate 24 positively insures any possible leakage and compels circulating fluid to pass up into the hollow brake flange if there should be any leakage.

In assembling the mechanism, the pipe 39 is slipped through the hole in the casting which forms the brake flange 16, this pipe 39 being of sufficient length to pass through the entire length of the drum center and to the opposite brake flange 16. The packing is then wound or placed around the ends of the pipe 39 and the screw glands 43 then forced inward against this packing, completely compressing it between the pipe 39 and the inner face of the packing space in the brake flange 16. When the packing has been sufficiently compressed, the lock nut 45 is set up to hold this gland in place. This gland is, of course capable of being tightened should a leak develop and is capable of being removed and a new packing inserted should it become necessary. One of these glands 43 is placed at each end of the pipe 39, as shown in Figure 1 which secures complete circulation of the cooling fluid and it is necessary to drill a passage only in the center of the shaft from the end of the shaft back to the point of connection in the middle of the casting 16.

This invention cheapens the cost of construction on the circulating system because of the fact that the fluid passages are formed largely as a part of the casting 16 and does away with the necessity of pipe connections in the end of the drum flanges, which might be knocked off by rough usage.

Another important feature of my invention resides in the provision of the tie rods 18 and the rivets 17 to bind the brake flanges 16 to the flange plate 14 which positively assures complete compression of the packing 26 and 27, thus providing a water seal which will prevent the leaking of circulating fluid at these points.

While I have illustrated a construction which I have found to be particularly valuable for the purpose intended, and I have illustrated the details which are particularly effective, I do not wish to be limited to the exact arrangement shown and the exact details, as these might be modified in many ways without departing from the spirit of the invention as defined in the appended claims.

I claim:—

1. A winding drum having a brake flange formed to provide a cooling chamber extending around its periphery, a shaft upon which the drum and brake flange is mounted and having a bore, the brake flange having a chamber formed between the shaft and the periphery of the brake flange, means for communicatively connecting the bore of the shaft to the peripheral chamber including a nipple extending out from the shaft, a packing surrounding the nipple, a gland surrounding the nipple and bearing against the packing, and a sleeve nut engaging the gland and bearing against the inside wall of the peripheral chamber and communicating with the interior of the chamber.

2. A winding drum having a brake flange formed to provide a peripheral cooling chamber, a shaft upon which the drum and brake flange are mounted and having a bore, the brake flange having a chamber formed between the shaft and the periphery of the brake flange, and means disposed within said chamber for communicatively connecting the bore of the shaft to the peripheral chamber including a nipple having a tapered extremity inserted into the shaft and formed with a shoulder, a packing surrounding the nipple and bearing against said shoulder, a gland surrounding the nipple and bearing against the packing, and a sleeve nut engaging the gland and bearing against the inside wall of the peripheral chamber and connecting with the interior of the chamber.

3. A winding drum having a brake flange formed to provide a peripheral cooling chamber, a shaft upon which the drum and brake flange are mounted and having a bore, the brake flange having a chamber formed between the shaft and the periphery of the brake flange, means disposed within said chamber for communicatively connecting the bore of the shaft to the peripheral chamber including a nipple having a tapered extremity inserted into the shaft and formed with a shoulder, a packing surrounding the nipple and bearing against said shoulder, a gland surrounding the nipple and bearing against the packing, a sleeve nut engaging the gland and bearing against the inside wall of the peripheral chamber and connecting with the interior of the chamber, and a detachable cover disposed upon the outer face of the brake flange and closing said second named chamber whereby access may be had to the interior of the chamber when necessary.

4. In a winding drum having a brake flange formed with a peripheral chamber for the circulation of cooling fluid, a shaft upon which the drum and brake flange are mounted for rotation and having a bore for the circulation of cooling fluid, the brake flange having a chamber opening upon the exterior face of the brake flange, means disposed within said chamber for communicatively connecting the peripheral chamber of the brake flange to the bore of said shaft and including adjustable packing means, and a cover for the opening in the second named chamber detachable to permit the packing means to be adjusted.

5. In a winding drum having two brake flanges, each formed with a peripheral cooling chamber, a shaft on which the drum and brake flanges are mounted, the shaft having respectively at its opposite ends fluid receiving and discharge bores, means associated with each brake flange communicatively connecting the respective peripheral chambers of the two brake flanges, each to one of said bores, and means communicatively connecting the peripheral chambers of the two brake flanges including a duct extending longitudinally through the drum and into said brake flanges, a pipe disposed in and adjacent each end of the duct and extending into the brake flanges, a packing disposed around the pipe in each brake flange, and a gland extending through the outer face of each brake flange and having screw-threaded engagement with the bore and bearing against the packing, the peripheral chamber of each brake flange being connected to the interior of the corresponding gland.

6. In a winding drum having two brake flanges, each formed with a peripheral cooling chamber, a shaft on which the drum and brake flanges are mounted, the shaft having respectively at its opposite ends fluid receiving and discharging bores, means associated with each brake flange communicatively connecting the respective peripheral chambers of the two brake flanges, each to one of said bores, means communicatively connecting the peripheral chambers of the two brake flanges including a duct extending longitudinally through the drum and into said brake flanges, a pipe disposed in and adjacent each end of the duct and extending into the brake flanges, a packing disposed around the pipe in each flange, a gland extending through the outer face of each brake flange and having screw-threaded engagement with the bore and bearing against the packing, the peripheral chamber of each brake flange being connected to the interior of the corresponding gland, and a lock nut engaging the exterior of the gland at the outer end thereof and bearing against the outer face of the corresponding flange.

7. In a winding mechanism, a drum, brake flanges on the drum each having a peripheral cooling chamber, a shaft on which the drum and brake flanges are mounted, means for supplying cooling fluid to the peripheral chamber of one brake flange and carrying it away from the peripheral chamber of the other brake flange, means for communicatively connecting the peripheral chamber of one brake flange with the peripheral chamber of the other brake flange, said means being disposed entirely within the periphery of the drum and exterior to the shaft, and means extending longitudinally of the drum and opening on the ends of the brake flanges and adjustable from the exterior of the brake flanges preventing leakage from said longitudinally extending connecting means to the exterior of the drum.

8. A winding mechanism including a drum, brake flanges secured to the drum, each brake flange having a peripheral cooling chamber, a shaft on which the drum and brake flanges are mounted, means for supplying cooling fluid to the peripheral chamber of one brake flange and carrying it away from the peripheral chamber of the other brake flange, the drum having a longitudinally extending duct and each brake flange having a chamber larger than the duct into which the duct opens, each chamber having communication with the peripheral chamber of the corresponding brake flange, a pipe projecting from the ends of the duct into each second named chamber, a packing surrounding the pipe, a gland having screw-threaded engagement with the end wall of each second named chamber, and extending inward from the exterior of the corresponding brake flange and bearing against said packing and surrounding the corresponding pipe, and a nut engaging each gland and bearing against the face of the brake flange.

9. In winding mechanism, a shaft having an inlet bore at one end and an outlet bore at the other, a drum body keyed to the shaft, a flange plate at each end of the drum body having a hub keyed to the shaft, an outer brake flange at each end of the drum body and having a hub surrounding the hub of the corresponding flange plate, each brake flange having a peripheral chamber, the contacting faces of each flange plate and the corresponding brake flange having complementary shoulders, a packing disposed between said shoulders, means for forcing the brake flange toward the flange plate to thereby compress said packing, and means extending through the hubs of the flange plates and brake flanges for communicatively connecting the peripheral chambers each with the corresponding bore in the shaft.

10. In a winding mechanism, a shaft having an inlet bore at one end and an outlet bore at the other, a drum body keyed to the shaft, a flange plate at each end of the drum having a hub keyed to the shaft, a brake flange at each end of the drum, each having a hub surrounding the hub of the corresponding flange plate and each having a peripheral fluid circulating chamber, the contacting faces of the two hubs having complementary shoulders defining packing spaces, a packing disposed between said shoulders, rivets holding each flange plate to the brake flange adjacent the periphery of the brake flange, and tie rods extending through the hubs of the brake flange and flange plate and through the drum whereby to urge the brake flange and flange plate toward each other to compress the packing and to hold the brake flanges against the ends of the drum body.

11. In a winding mechanism, a drum, brake flanges on the drum, each having a peripheral cooling chamber, a shaft on which the drum and flanges are mounted, means for supplying cooling fluid to the peripheral chamber of one flange and carrying it away from the peripheral chamber of the other flange, means communicatively connecting the peripheral chamber of one flange with the peripheral chamber of the other flange and extending longitudinally of the drum and opening upon the exterior ends of the drum, said means being disposed in the periphery of the drum and exterior to the shaft, and means preventing leakage from said longitudinally extending connecting means to the exterior of the drum.

12. In a winding mechanism, a drum having a wall concentric to the axis of the drum and formed in this wall with a fluid-tight passage extending parallel to the axis of the drum, brake flanges on the drum, each having a peripheral cooling chamber, a shaft on which the drum and flanges are mounted, the drum having a wall concentric to the shaft, the drum and shaft being engaged with each other for common rotation, means for supplying cooling fluid to the peripheral chamber of one flange and carrying it away from the peripheral chamber of the other flange, and means communicatively connecting the peripheral chamber of one flange with the peripheral chamber of the other flange including said passage formed in the wall of the drum.

In testimony whereof I affix my signature.

LEE J. BLACK.